United States Patent

[11] 3,625,385

[72] Inventor Allan R. Ide
    Cyprus, Calif.
[21] Appl. No. 7,924
[22] Filed Feb. 2, 1970
[45] Patented Dec. 7, 1971
[73] Assignee Metropolitan Stevedore Company
    Wilmington, Calif.

[54] FORKLIFT APPARATUS
    4 Claims, 9 Drawing Figs.
[52] U.S. Cl. .................................................. 214/750,
                                                            187/9
[51] Int. Cl. ...................................................... B65g 47/00
[50] Field of Search .......................................... 214/514,
                                                    730, 750; 187/9

[56] References Cited
    UNITED STATES PATENTS
2,601,931  7/1952  Dunham et al. ............... 214/514 X 2,639,051  5/1953  Thomas ....................... 214/514
2,993,610  7/1961  Kughler ....................... 214/514

Primary Examiner—Albert J. Makay
Attorney—Fulwider, Patton, Rieber, Lee & Utecht ABSTRACT: Forklift apparatus for use with pallets which are rectangular in plan view and adapted to receive the tines of a forklift in both their long and short dimensions. The apparatus includes a fork having forwardly projecting tine means. A vertical limit plate is disposed rearwardly on the tines and is shiftable between a first position limiting extension of the tine means to, or less than, the relatively short dimension and shiftable to a second position to limit insertion of the tine means under said pallets to, or less than, the long dimension. Actuation means is provided for shifting the limit plate between the first and second positions whereby such limit plate can be adjusted to permit full extension of the tines in either direction under the pallet but to limit projection of the tines from the far side of the pallet to thereby avoid damage to adjacent cargo.

PATENTED DEC 7 1971

INVENTOR.
ALLEN R. IDE
BY Fulwider, Patton, Rieber,
Lee and Utecht
ATTORNEYS

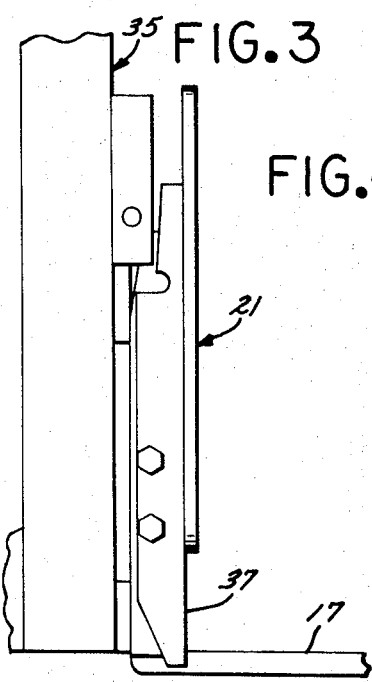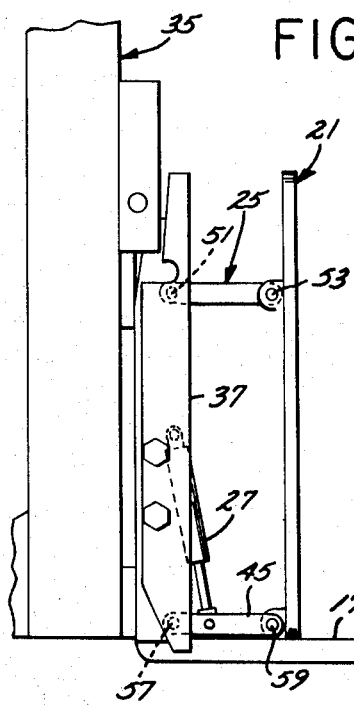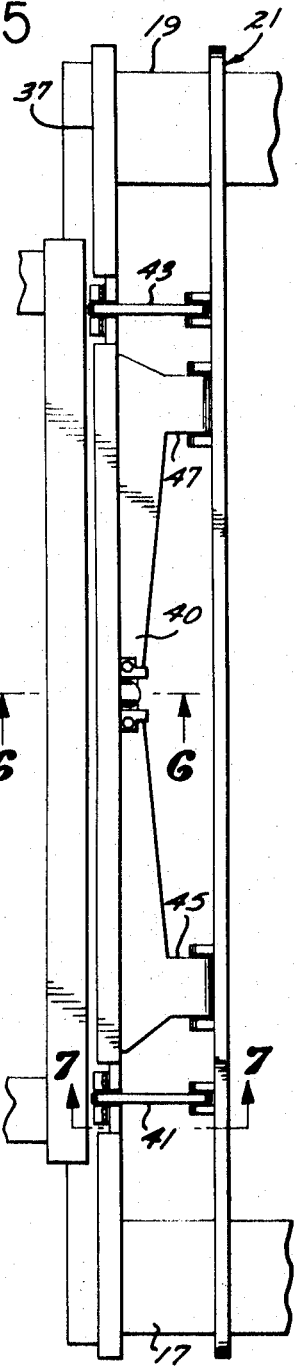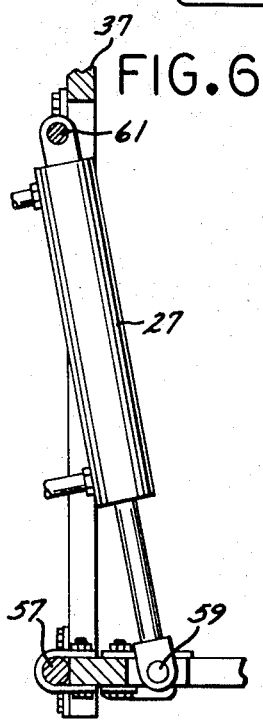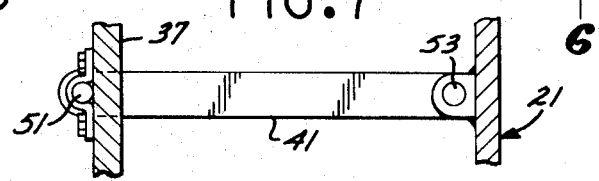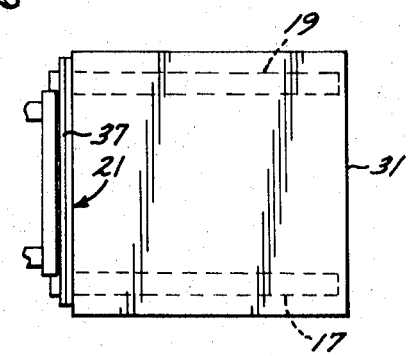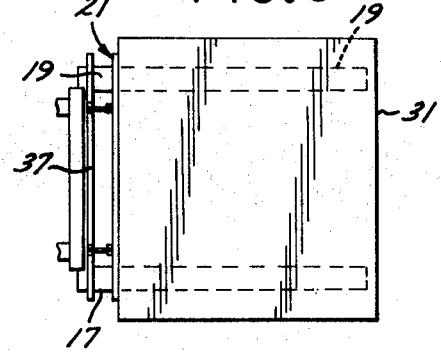

FORKLIFT APPARATUS

BACKGROUND OF THE INVENTION

1. Field of the Invention

The present invention relates to fork lift devices.

2. Description of the Prior Art

Fork lift devices have been proposed which include shiftable limit means for limiting projection of the tines under loading pallets. A fork lift device of this type is shown in U.S. Pat. No. 2,633,260. Fork lift devices of this type suffer the shortcoming that they require manual shifting of the limit means thereby necessitating a helper to accomplish such switching or requiring the operator to leave the operator's position to shift the limit means.

SUMMARY OF THE INVENTION

The present invention is characterized by a fork lift apparatus including a fork having forwardly projecting tines. A limit plate is shiftable between first and second positions along the tines to provide two different lengths of projection of such tines. Actuation means is provided for shifting the limit plate between the first and second positions whereby such limit plate may be adjusted to the first position for insertion in one direction under a rectangular pallet and may be shifted to the second position for insertion of the tines in the perpendicular direction under such rectangular pallet.

An object of the present invention is to provide a fork lift apparatus of the type described wherein the limit plate may be adjusted to a first position for insertion in one direction under a rectangular pallet to limit projection beyond the opposite side and, also, may be shifted to a second position for insertion in a perpendicular direction under such rectangular pallet, and will, likewise, be limited from projection beyond the opposite side thereby avoiding damage to adjacent cargo.

Another object of the present invention is to provide a fork lift apparatus of the type described wherein the limit plate may be shifted between the first and second positions by the fork lift operator without leaving his operator's platform.

These and other objects and the advantages of the present invention will become apparent from a consideration of the following detailed description when taken in conjunction with the accompanying drawings.

DESCRIPTION OF THE DRAWINGS

FIGS. 3 and 4 are partial side elevational views, in enlarged scale, of the fork lift apparatus shown in FIG. 1;

FIG. 5 is a partial horizontal sectional view, in enlarged scale, of the fork lift apparatus shown in FIG. 1;

FIG. 6 is a vertical sectional view, in enlarged scale, taken along the line 6—6 of FIG. 5;

FIG. 7 is a vertical sectional view, in enlarged scale, taken along the line 7—7 of FIG. 5; and FIGS. 8 and 9 are top plan views, in reduced scale, of the tines of the fork included in the fork lift apparatus shown in FIG. 1 inserted in different directions under a rectangular pallet.

DESCRIPTION OF THE PREFERRED EMBODIMENT

Figure 1:
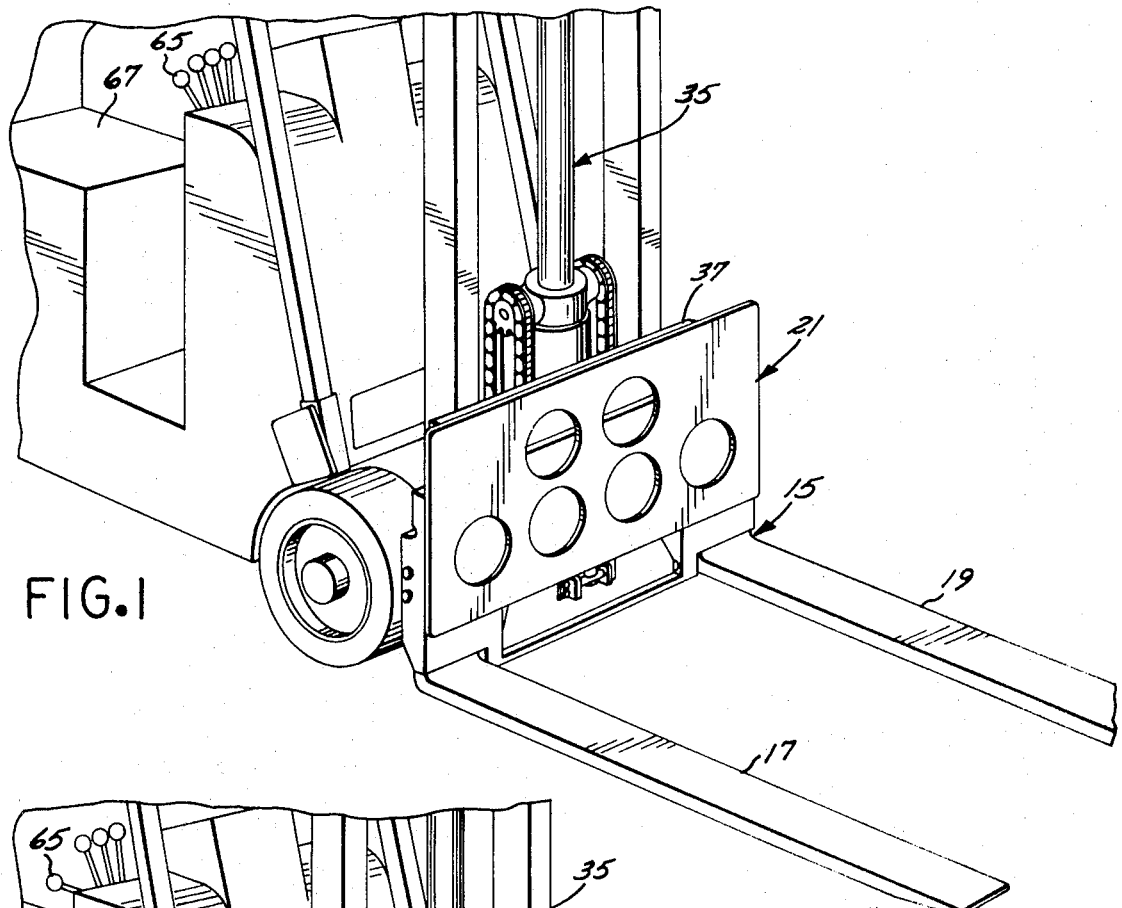
FIGS. 1 and 2 are perspective views of a fork lift apparatus embodying the present invention.
Figure 2:
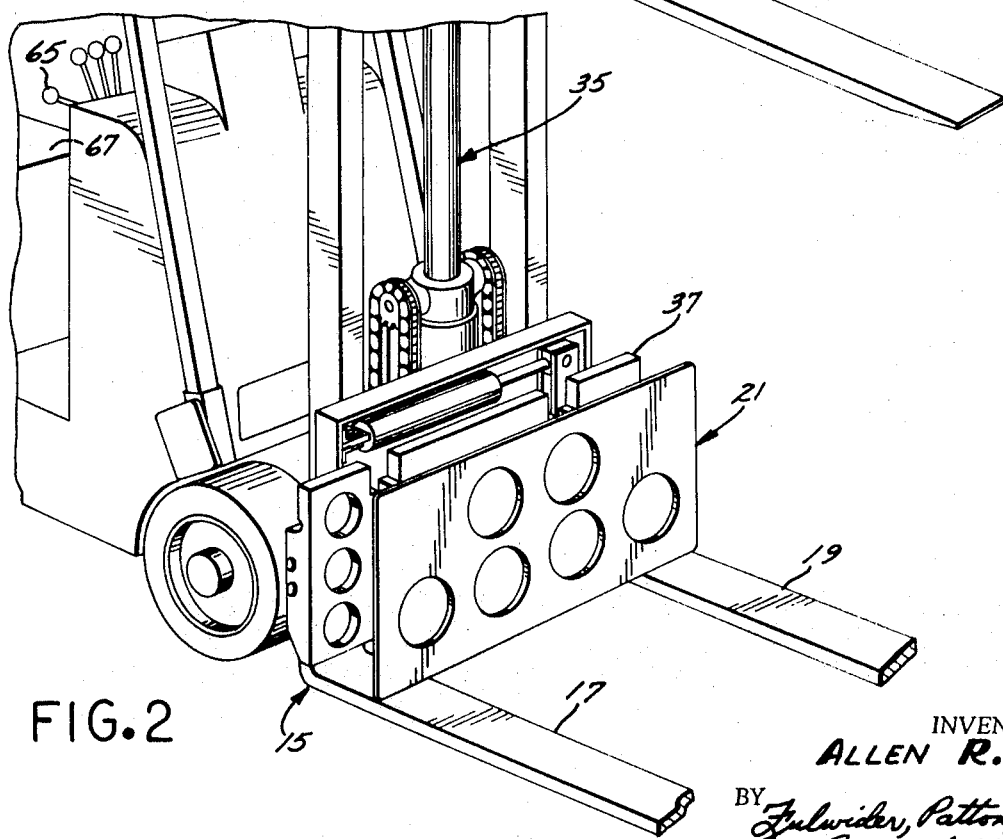

Referring to FIGS. 1, 2 and 4, the fork lift apparatus of present invention includes, generally, a fork 15 having a pair of forwardly projecting tines 17 and 19. A limit plate, generally designated 21, is disposed at the rear of the tines 17 and 19 and is carried from the fork 15 by means of a locating device in the form of a parallel linkage, generally designated 25, (FIG. 4) and is shiftable from its forward position shown in FIG. 4 to its rearward position shown in FIG. 3 by means of a hydraulic cylinder 27. Thus, the limit plate 21 may be adjusted to its forward position shown in FIGS. 4 and 9 and the tines 17 and 19 extended the short direction under a rectangular- shaped loading pallet 31 and such tines will be limited from projection beyond the far side of such pallet. When the tines 17 and 19 are to be inserted the long direction under the pallet 31, the cylinder 27 may be retracted to raise the limit plate 21 and move it to its rearward position shown in FIG. 3 and the tines 17 and 19 then inserted in the long direction under the pallet 31 as shown in FIG. 8.

The fork lift apparatus shown in FIG. 1 is a conventional fork lift truck and includes a vertical column, generally designated 35, on which the fork 15 is mounted for being raised and lowered. The fork 15 includes a backplate 37 having the forwardly projecting tines 17 and 19 depending from the lower edge thereof. The limit plate 21 is carried from the backplate 37 and by means of the linkage 25, such linkage including a pair of upper arms 41 and 43 and a yoke, generally designated 40, forming a pair of forwardly projecting lower arms 45 and 47. The upper arms 41 and 43 are carried at the rear extremities from the backplate 37 by means of pivot pins 51 and such arms are connected on their forward extremities to the limit plate 21 by means of pivot pins 53.

The rear extremity of the yoke 40 is journaled on a shaft 57 and the front extremity of the arms 45 and 47 are connected to the limit plate 21 by means of pivot pins 59. The hydraulic cylinder 27 is carried on its dead end from the backplate 37 by means of a pivot pin 61 and the rod end is connected with the intermediate portion of the yoke 40 by means of a pivot pin 59 (FIG. 6).

Conduit means is provided for delivering hydraulic fluid to the hydraulic cylinder 27 and fluid through such conduit means is controlled by a handle 65 mounted adjacent the operator's seat 67 of the fork lift whereby the operator can shift the plate 21 without leaving the operator's platform.

In operation, when a pallet 31 is to have the tines inserted thereunder in the long dimension, the handle 65 will be actuated to retract the cylinder 27 and then raise the limit plate 21 to the position shown in FIG. 3. The tines 17 and 19 can then be inserted nearly the full length under the pallet 31 but will be limited from projecting beyond the far side of such pallet and endangering damage to cargo positioned immediately adjacent such pallet.

On a subsequent trip, it may be desirable to extend the tines 17 and 19 under a pallet in the short dimension and the operator will adjust the handle 65 to extend the cylinder 27 and lower the limit plate 21 to come to rest on the tines 17 to hold such limit plate in the position shown in FIG. 4. The tines 17 and 19 may then be inserted under the pallet 31 in the short dimension as shown in FIG. 9 and when the limit plate 21 engages the pallet the rigid arms 45 will prevent rearward movement of such plate thereby preventing further extension of the tines 17 under such pallet to prevent projection thereof beyond the far side of such pallet to thereby avoid damage to adjacent cargo.

From the foregoing detailed description it will be apparent that the fork lift apparatus of present invention enables the fork truck operator to set the limit plate in two different positions for receiving a rectangular pallet from either its long or narrow dimensions without danger of projecting the tines beyond the far side of such pallet and damaging the adjacent cargo.

Various modifications and changes may be made with regard to the foregoing detailed description without departing from the spirit of the invention.

I claim:

1. Fork lift apparatus for use with lifting pallets having a relatively short dimension and a relatively long dimension, said apparatus comprising:

a fork including forwardly projecting tine means;

a limit plate disposed rearwardly on said tine means and shiftable arcuately downwardly and forwardly to a first position disposed intermediately on said tine means to limit extension of said tine means under said pallets to less than said relatively short dimension and shiftable arcuately upwardly and rearwardly to a second position to limit insertion of said tine means under said pallets to less than said relatively long dimension;

locating linkage carried by said fork for mounting said limit plate to maintain said limit plate in a generally vertical orientation in both said first and second positions; and actuation means for shifting said limit plate between said first and second positions whereby said actuation means may be actuated to shift said limit plate to said one position when said tines are inserted under said pallets in said relatively short dimension and to shift said limit plate to said second position when said tines are to be inserted under said pallets to said relatively long dimension to thereby limit said tine means from projecting beyond the opposite sides of said pallets.

2. Fork lift apparatus set forth in claim 1 that includes:
an operator's platform; and
control means connected with the actuation means and including a control handle disposed adjacent said operator's platform.

3. Fork lift apparatus as set forth in claim 1 wherein:
said locating means includes a parallelogrammatic linkage including longitudinally extending rigid arms pivotally connected on their rear extremities to said fork and on their respective front extremities to said limit plate and of sufficient length to enable said limit plate to be moved from said second position downwardly and forwardly to come to rest on said tine means disposed in said first position with said arms disposed in a substantially horizontal orientation to limit rearward movement of aid limit plate; and said actuation means includes hydraulic cylinder means connected with said linkage and operable to selectively raise said front extremities of said arms to retract said plate to said second position and to lower said front extremities of said arms to extend said limit plate to said first position.

4. Fork lift apparatus as set forth in claim 1 that includes:
an operator's platform;
control means adjacent said platform for controlling said actuation means whereby the operator can shift said limit plate between said first and second positions without leaving said platform.

* * * * *